United States Patent [19]

Grube

[11] 4,237,567

[45] Dec. 9, 1980

[54] METHOD OF MAKING A FASTENER STRIP

[75] Inventor: William L. Grube, Lake Bluff, Ill.

[73] Assignee: MacLean-Fogg Company, Mundelein, Ill.

[21] Appl. No.: 855,138

[22] Filed: Nov. 28, 1977

[51] Int. Cl.³ .................... B21D 53/20; F16B 39/28
[52] U.S. Cl. .................................. 10/86 CL; 29/417; 29/432; 151/41.72; 141/41.73
[58] Field of Search ............... 29/432, 432.1, 509, 29/417; 10/86 CL, 86 R, 76 R, 74; 85/32, 32.1; 151/41.72, 41.73

[56] References Cited

U.S. PATENT DOCUMENTS

| | | | |
|---|---|---|---|
| 1,400,244 | 12/1921 | Sleffel | 10/76 R |
| 1,664,480 | 4/1928 | Murphy | 10/76 R |
| 2,206,740 | 7/1940 | Burke | 10/86 CL |
| 2,254,644 | 9/1941 | Cousino | 10/86 CL |
| 2,279,574 | 4/1942 | Langmaid | 10/86 CL |
| 3,704,507 | 12/1972 | Grube | 151/41.72 X |
| 3,775,791 | 12/1973 | Grube | 10/86 CL |
| 3,786,528 | 1/1974 | Sol | 10/86 CL |
| 3,877,133 | 4/1975 | Grube | 29/432.2 X |
| 4,119,827 | 10/1978 | Lenox | 29/509 |

FOREIGN PATENT DOCUMENTS 462360 11/1913 France .................. 10/86 R
50-6428 3/1975 Japan .................. 10/86 R

*Primary Examiner*—James T. McCall
*Attorney, Agent, or Firm*—Mason, Kolehmainen, Rathburn & Wyss

[57] ABSTRACT

A strip of fasteners such as pierce nuts is formed from a metal blank with no scrap resulting from the provision of a spacing between adjacent nut bodies, and without the difficulty and expense incident to attaching nut bodies to connecting elements. The body portion of a laterally flanged blank is severed in the transverse direction to separate nut bodies from the blank without fracturing the flanges. The flanges are severed in the longitudinal direction to form severed longitudinally extending flange segments integral at both ends with unsevered flange segments. When the flanges are straightened, the stretching of the severed flange segments resulting from shearing provides a spacing between adjacent nut bodies in the strip. The strip includes spaced apart nut bodies interconnected by continuous lateral flanges. The flanges include unsevered lateral flange segments integral with both sides of each nut body, and severed flange segments integral at both ends with the unsevered flange segments. Elongation of the severed flange segments provides spacing between adjacent nut bodies.

31 Claims, 27 Drawing Figures

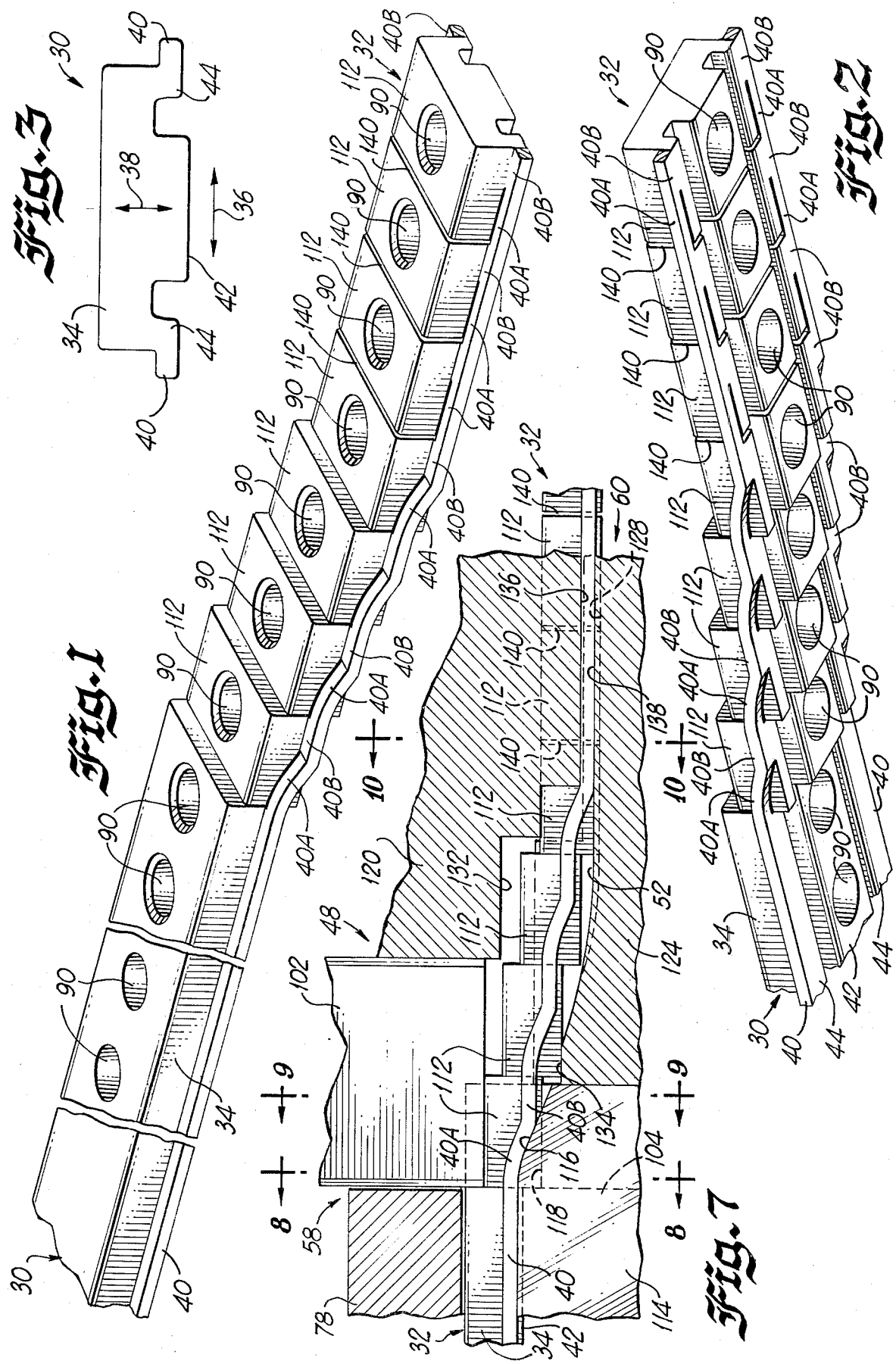

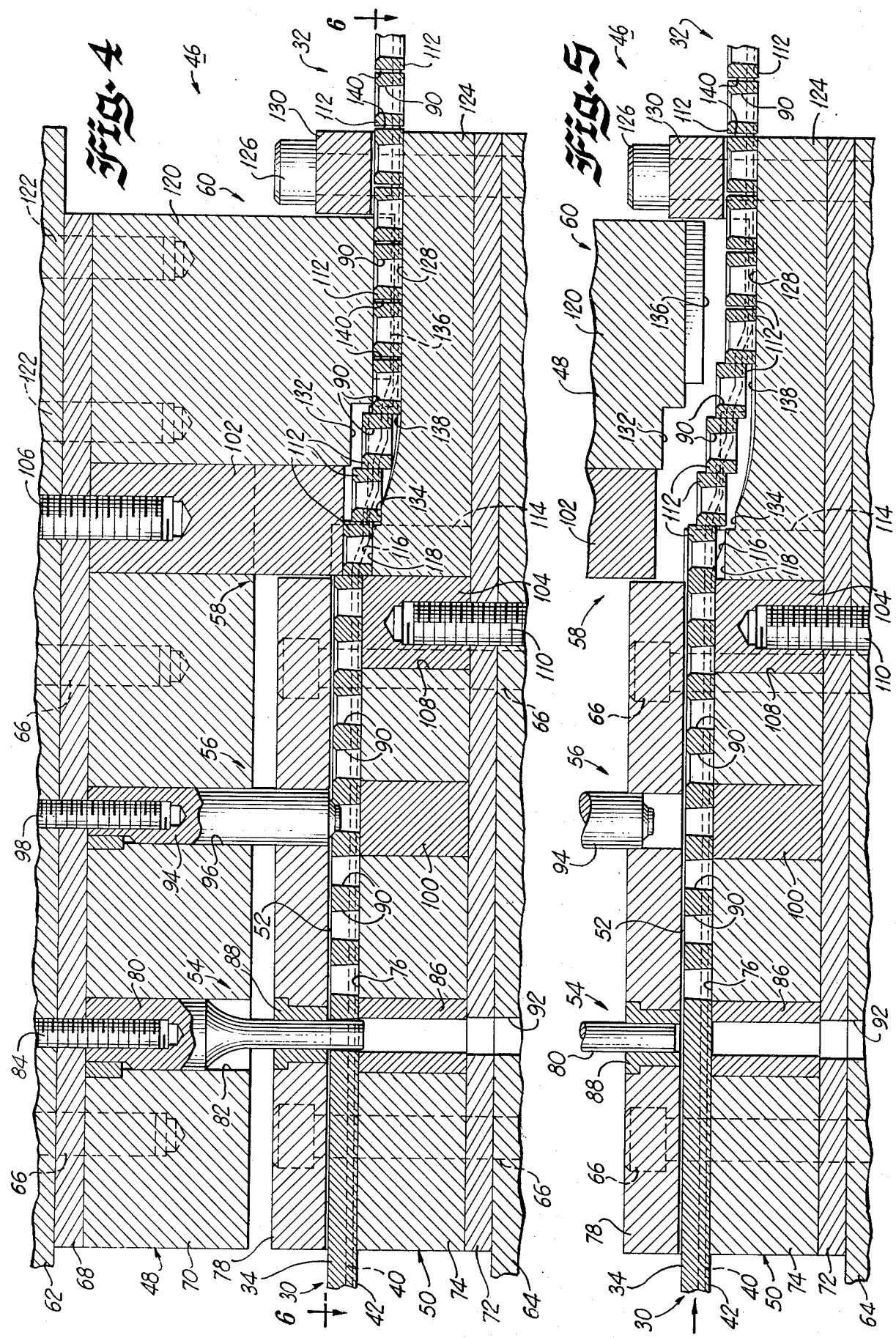

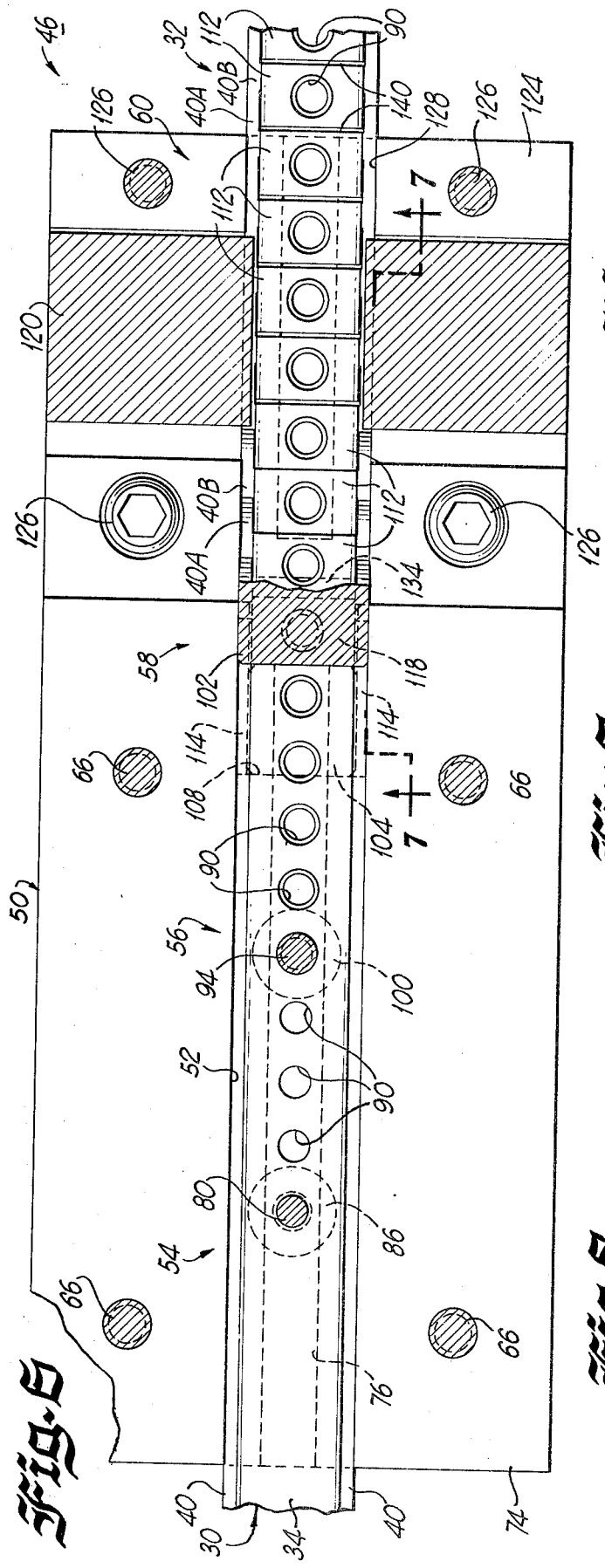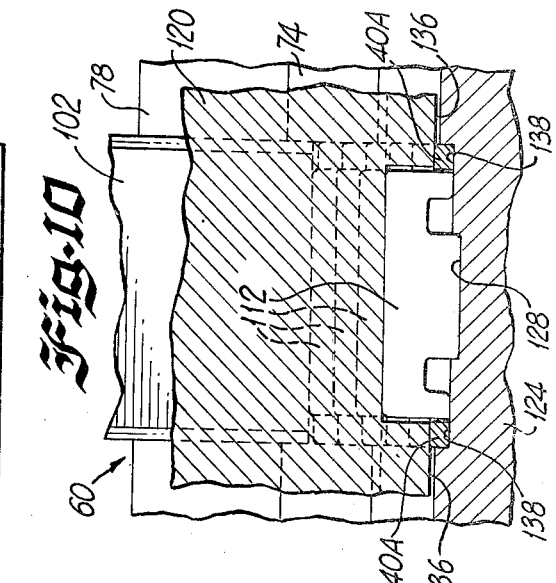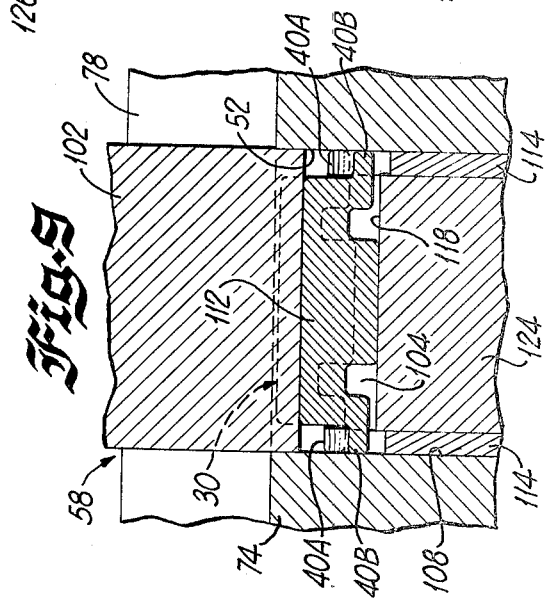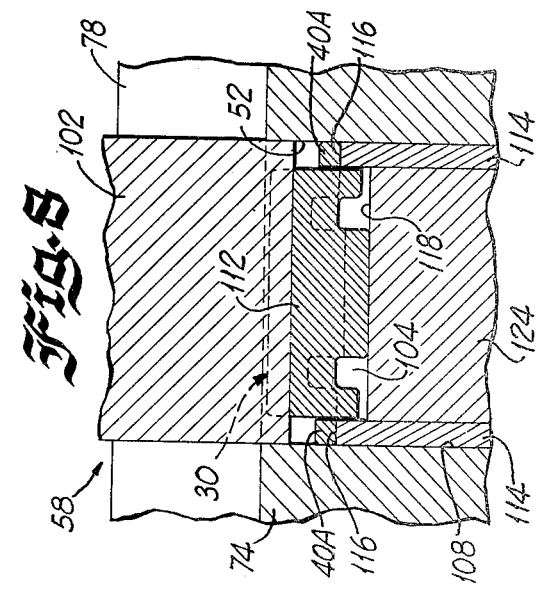

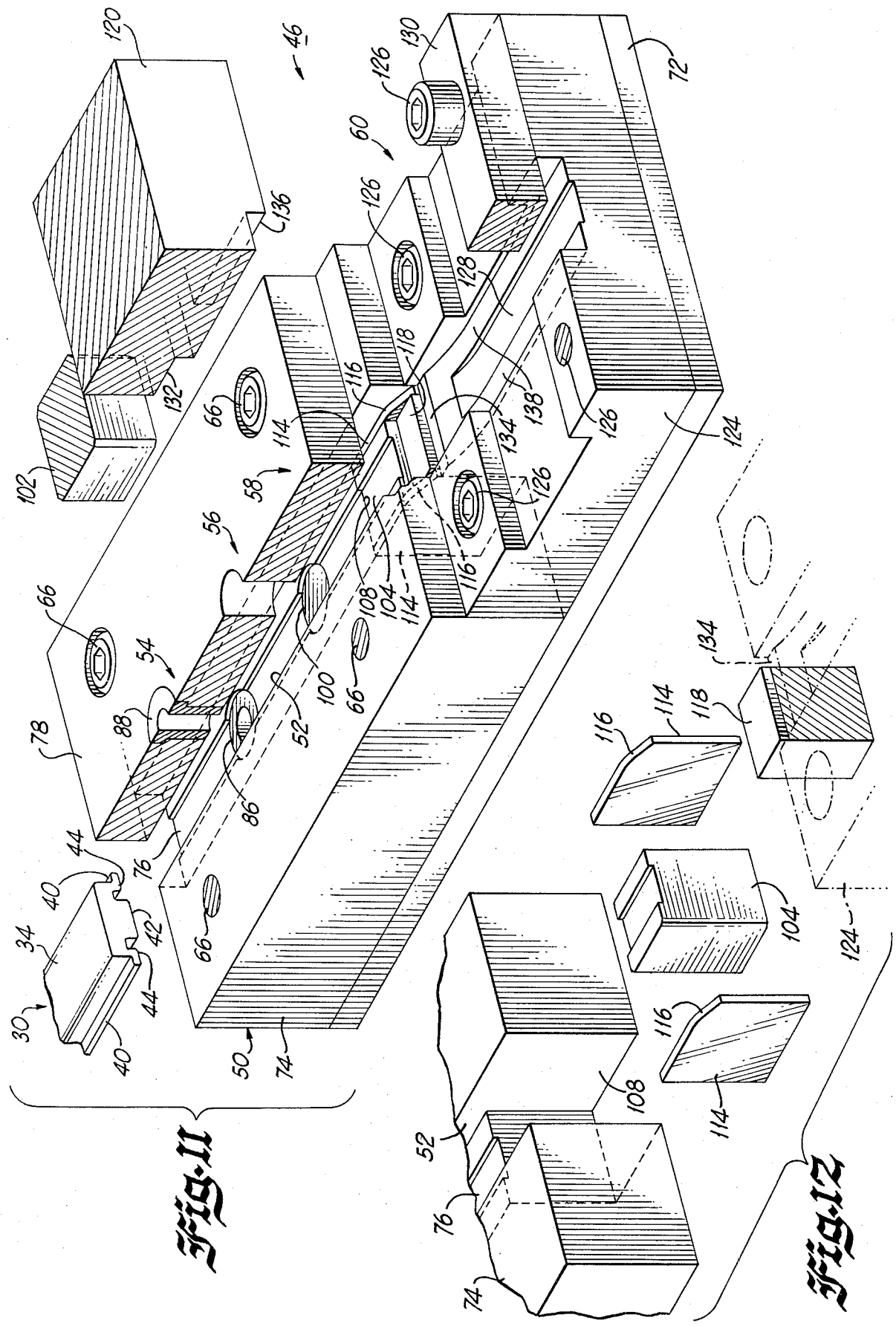

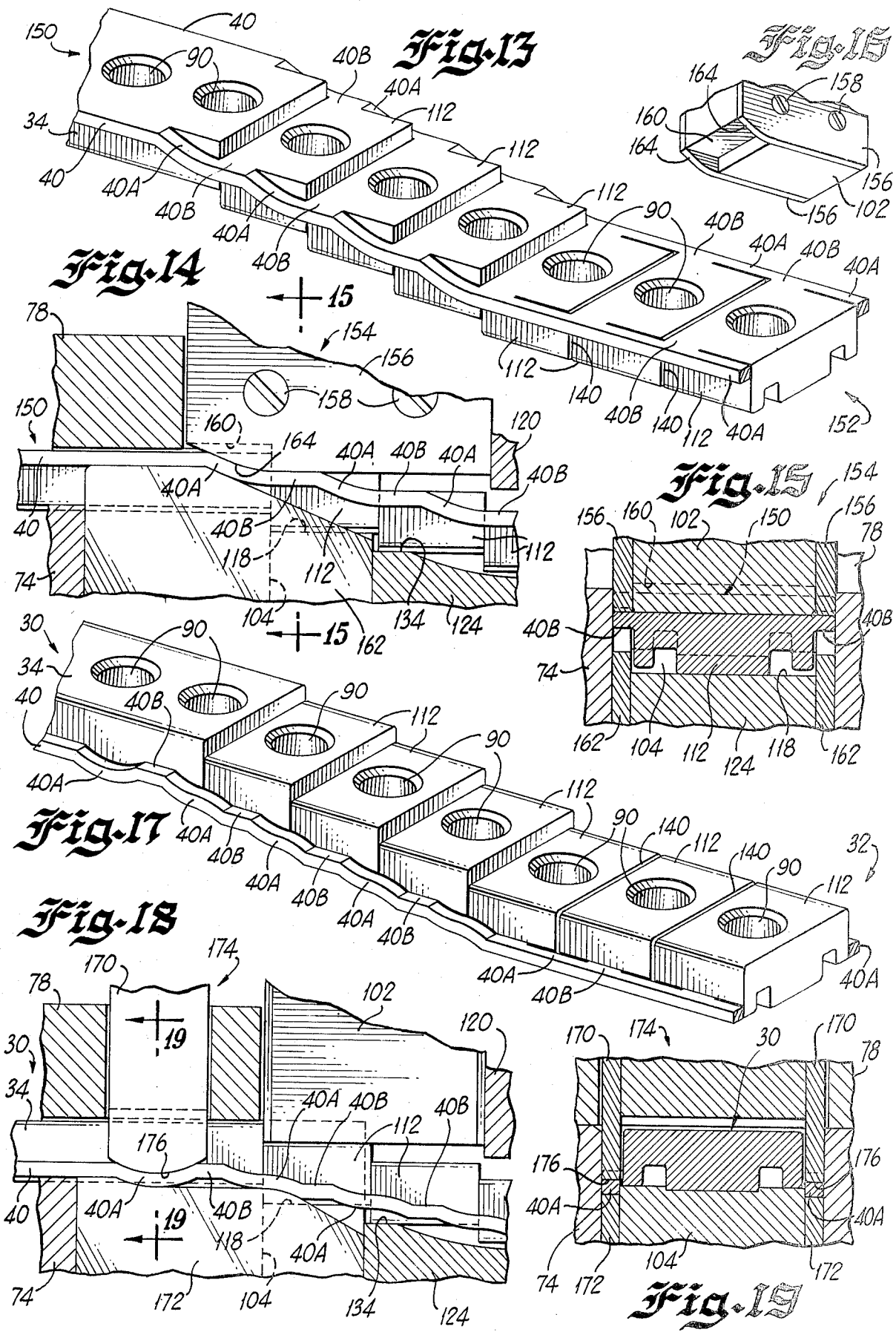

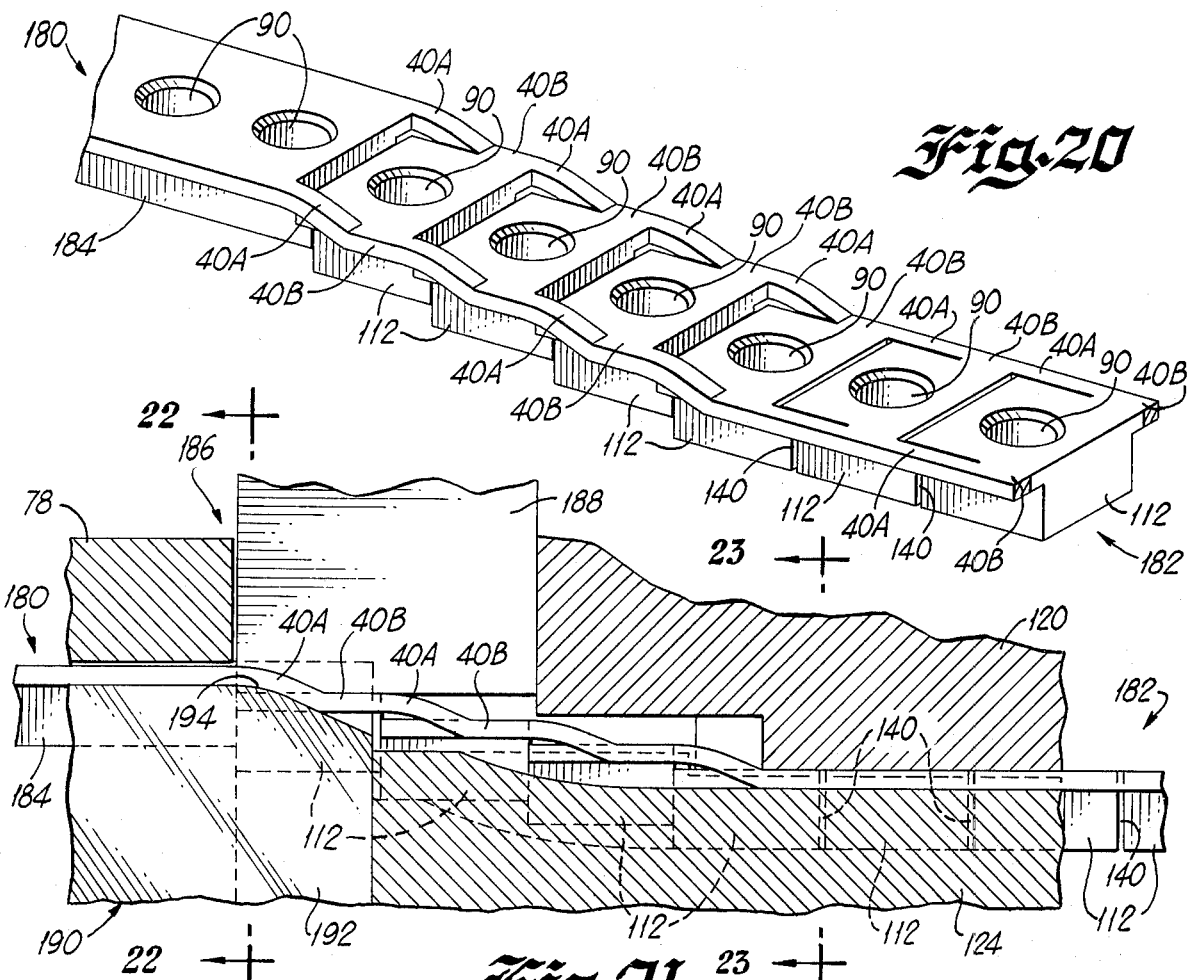
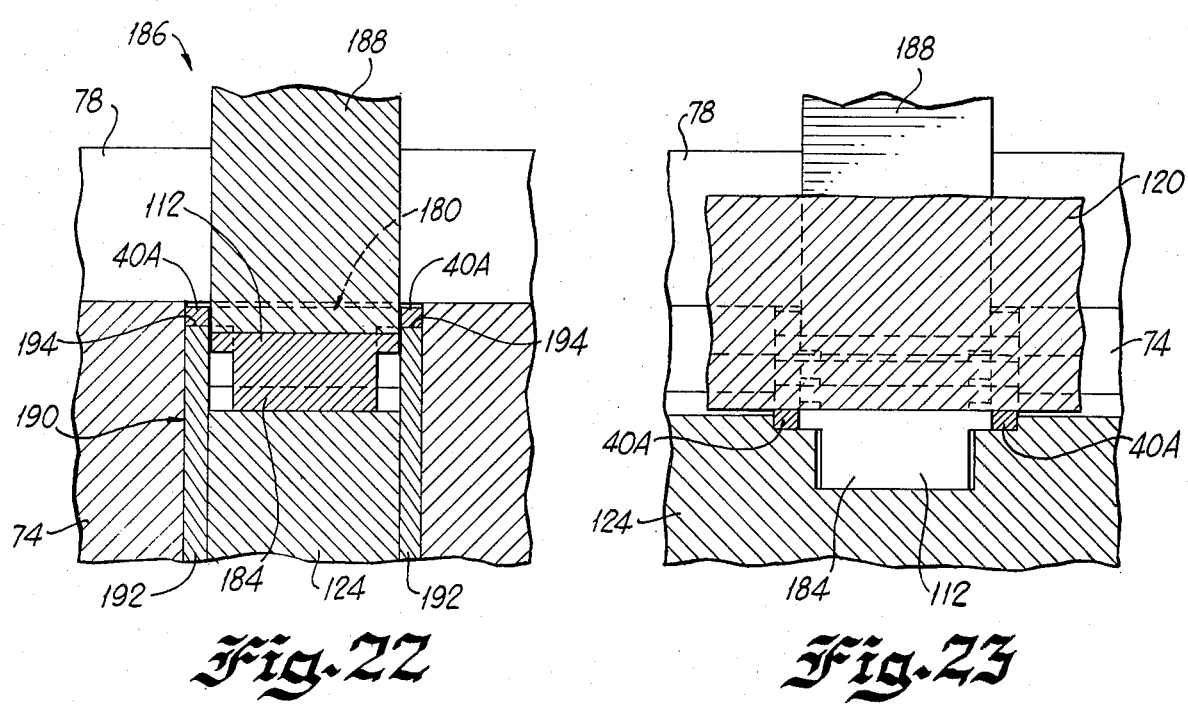
Fig.20
Fig.21
Fig.22
Fig.23

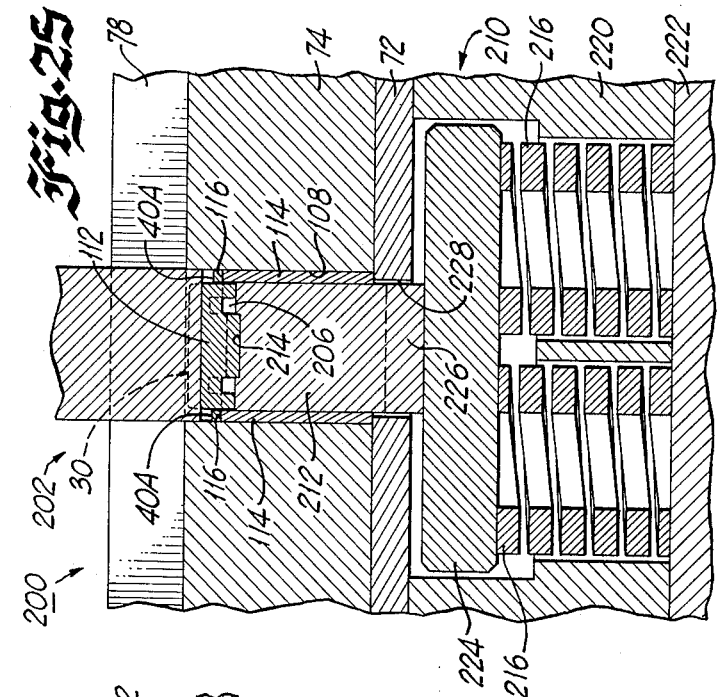
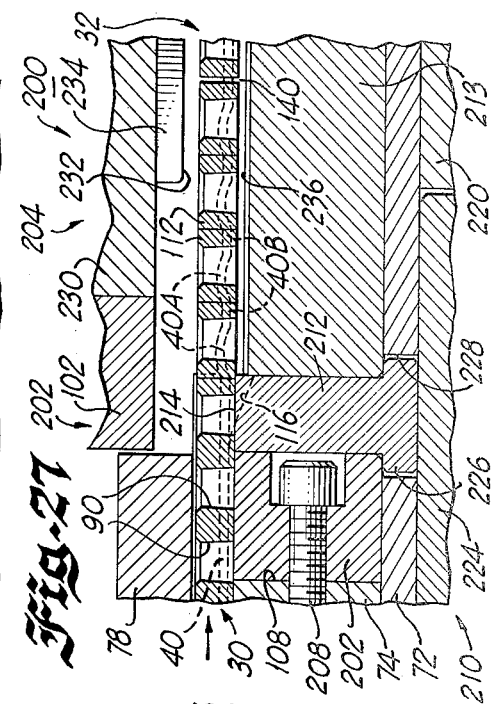

METHOD OF MAKING A FASTENER STRIP

The present invention relates to improvements in methods for manufacturing fastener strips such as strips of pierce nuts, and to an improved fastener strip.

Pierce nuts are nuts used as punches to form openings for themselves in a panel to which they are secured as part of the punching operation. In the past, pierce nuts have been provided in loose or bulk form. Such nuts are typically manufactured by shearing nut bodies from a continuous blank with cutoff dies. The use of pierce nuts in bulk form requires that the nuts be handled, oriented and fed individually to an application tool.

Because of the expense, inconvenience and lack of reliability experienced with bulk pierce nuts, the desirability of providing pierce nuts in strip form has been recognized. Among the requirements of a strip of pierce nuts are that the strip be flexible so that it may be provided in coil form; that the nuts of the strip be interconnected by structure capable of being severed during application of a nut to a panel; and that the nuts be uniformly oriented and accurately spaced apart for proper positioning during the application process.

One method for making pierce nuts in strip form is that disclosed in U.S. Pat. No. 3,775,791—Grube. This method is performed upon an elongated blank having a relatively thick body portion and having laterally extending flanges. After spaced holes are formed in the blank, material is transversely punched out of the body portion of the blank to define individual nut bodies and to leave remaining portions of the flanges which serve to interconnect the adjacent nut bodies. While the method disclosed in that patent and the nut strip produced thereby have been widely accepted and used, the method is subject to a disadvantage in that the material punched from the blank is scrap. Since part of the material of the blank is not utilized in the finished fastener strip, the cost of manufacturing the strip is increased.

Another method which has been proposed for manufacturing pierce nut strips is disclosed in British Pat. No. 1,358,099 published on 26 June 1974. In this method, a rolled bar is sheared into separate or individual loose nut bodies including retainer grooves. Thereafter, the individual nut bodies must be oriented and aligned and attached along the lengths of a pair of rods or wires received in the retainer grooves. One disadvantage of this method is that the spacing between adjacent nuts depends upon accuracy in the orienting, aligning and attaching processes. Moreover, since the individual nut bodies are entirely sheared from the strip, the problems resulting from the handling, orienting and feeding of bulk pierce nuts are experienced.

Among the objects of the present invention are to provide an improved method of manufacturing fastener strips wherein the individual fasteners need never be handled in loose or bulk form; wherein precise alignment, orientation and positioning of individual fasteners in the strip is assured; and wherein no scrap results from the provision of spacing between adjacent fasteners in the strip. Other objects of the invention are to provide an improved method for forming pierce nuts from a blank; to provide an improved pierce nut forming method wherein the individual pierce nut bodies are not entirely separated from the strip; to provide a method which overcomes the disadvantages of known methods of pierce nut strip manufacture, including those referred to above; and to provide a fastener strip manufacturing method characterized by simplicity, reliability and accuracy.

Other objects of the present invention are to provide an improved fastener strip; to provide a strip of nut bodies satisfying the requirements of flexibility, separability of individual nuts, and accuracy in nut positioning, without the heretofore experienced disadvantage of scrap expense; and to provide a pierce nut strip of improved configuration which is capable of being economically and easily manufactured.

In brief, in accordance with the above and other objects of the present invention, there is provided a method of forming a strip of interconnected fastener bodies from an elongated blank having a body portion and a pair of opposed flanges thinner than the body portion. The blank is longitudinally severed at regular intervals along its length to separate spaced segments of the lateral flanges from the body portion of the blank. The severed flange segments are integral at both ends with unsevered flange segments. The main body portion of the blank is transversely severed at regular intervals to form discrete nut bodies interconnected with adjacent nut bodies by the severed flange segments. The stretching of the severed flange segments resulting from shearing thereof provides spacing between adjacent nut bodies.

A strip of fasteners in accordance with the present invention includes a number of oriented and aligned nut bodies together with a pair of laterally extending flanges continuous throughout the length of the strip. The flanges include unsevered flange segments integral with the opposite sides of each nut body. Severed flange segments are interspersed with the unsevered segments and are integral therewith at both ends. The severed flange segments are stretched or elongated in order to provide spacing between adjacent nut bodies.

The present invention together with the above and other objects and advantages thereof will appear from the following detailed description in which reference is made to the accompanying drawings, wherein:

FIG. 1 is an isometric view of a strip of fasteners embodying the present invention, and of a blank upon which the method of the invention is performed;

FIG. 2 is a different isometric view of the strip and blank of FIG. 1;

FIG. 3 is an end view illustrating the profile of the blank of FIGS. 1 and 2;

FIG. 4 is a vertical sectional view, taken along the longitudinal axis of the blank and strip, illustrating stamping press tooling used to perform the method of the present invention, the tooling being illustrated in the closed or shut position;

FIG. 5 is a view similar to FIG. 4 with the tooling illustrated in the open position;

FIG. 6 is a sectional view taken along the line 6—6 of FIG. 4;

FIG. 7 is a sectional view on an enlarged scale taken along the line 7—7 of FIG. 6;

FIG. 8 is a sectional view taken along the line 8—8 of FIG. 7;

FIG. 9 is a sectional view taken along the line 9—9 of FIG. 7;

FIG. 10 is a sectional view taken along the line 10—10 of FIG. 7;

FIG. 11 is a fragmentary, exploded isometric view of portions of the tooling of FIG. 4;

FIG. 12 is an exploded isometric view of a part of the tooling illustrated in FIG. 11;

FIG. 13 is an isometric view of a strip of fasteners comprising an alternative embodiment of the invention, and of a blank upon which a method comprising an alternative embodiment of the invention is performed;

FIG. 14 is a view similar to a part of FIG. 7 but illustrating a method of forming the strip of FIG. 13;

FIG. 15 is a sectional view taken along the line 15—15 of FIG. 14;

FIG. 16 is an isometric view on a reduced scale of part of the tooling shown in FIG. 14;

FIG. 17 is an isometric view of a strip of fasteners comprising another alternative embodiment of the invention, and of a blank on which a method comprising another alternative embodiment of the invention is performed;

FIG. 18 is a view similar to FIG. 7, but illustrating tooling used in carrying out a method of forming the strip of FIG. 17;

FIG. 19 is a sectional view taken along the line 19—19 of FIG. 18;

FIG. 20 is an isometric view of a strip of fasteners comprising another alternative embodiment of the invention, and of a blank upon which a method comprising another alternative embodiment of the invention is performed;

FIG. 21 is a view similar to FIG. 7, but illustrating tooling used in carrying out a method of forming the strip of FIG. 20;

FIG. 22 is a sectional view taken along the line 22—22 of FIG. 21;

FIG. 23 is a sectional view taken along the line 23—23 of FIG. 21;

FIG. 24 is a partial vertical sectional view taken along the longitudinal axis of the blank and strip, illustrating tooling used to perform a method comprising an alternative embodiment of the present invention, the tooling being illustrated in the closed or shut position;

FIG. 25 is a sectional view taken along the line 25—25 of FIG. 24;

FIG. 26 is a view similar to FIG. 24 illustrating the tooling in the open position prior to feeding of the blank and strip; and FIG. 27 is a view similar to part of FIG. 26 following feeding of the blank and strip.

Having reference now to the drawings, and initially to FIGS. 1-3, there is illustrated a workpiece or blank generally designated as 30 formed into a novel fastener strip generally designated as 32 by the method of the present invention. In the illustrated embodiments of the invention, the fasteners of the strip comprise pierce nuts. Features of the invention may be applicable to other fasteners in strip form wherein the fastener bodies are relatively rigid and inflexible and are interconnected in a strip by flexible and severable structure.

The blank 30 is provided in elongated, functionally continuous form, and has a uniform profile or cross-sectional configuration throughout its length (FIG. 3). Where the fasteners of the strip are pierce nuts, the blank is formed of a relatively hard material, one example being cold rolled steel.

The profile of the blank 30 is formed so as to be substantially identical with that of the finished nuts of the strip 32. In the embodiments of the invention illustrated in the drawings, the blanks include a body portion 34 having relatively large dimensions in the lateral and transverse directions. As used herein, the term lateral means the direction indicated by the arrow 36 in FIG. 3, while the term transverse is used to indicate the direction illustrated by the arrow 38 in FIG. 3. The term longitudinal is intended to describe the direction of the central longitudinal axis or length of the blank or strip.

Laterally projecting from opposed sides of the blank body portion 34 are a pair of flanges 40 continuous throughout the length of the blank. The flanges are significantly thinner or smaller in the transverse direction than is the body portion 34.

The particular configuration of the body portion 34 is dictated by the nature of the fastener to be provided. Typically where pierce nuts are provided the body portion has a generally rectangular overall configuration, and this is the case in the illustrated embodiments of the invention. The blank 30 is intended to be formed into a strip of high stress pierce nuts, and consequently the body portion includes a pilot portion 42 flanked by a pair of foot portions 44 from which the flanges 40 project.

It is preferred that the method of the present invention be carried out in a stamping press. In FIGS. 4-12, there is illustrated tooling generally designated as 46 for manufacturing the fastener strip 32 from the blank 30. In general, the tooling 46 includes a punch assembly generally designated as 48 and a die assembly generally designated as 50 defining a feed path 52 for movement of the blank 30 and the fastener strip 32 through the tooling 46. Disposed along the feed path 52 are a piercing station generally designated as 54, a coining station generally designated as 56, a shearing station generally designated as 58, and a straightening station generally designated as 60.

More specifically, the tooling 46 includes upper and lower die shoes 62 and 64 to which the punch assembly 48 and die assembly 50 are attached in conventional fashion, as by bolts 66. The punch assembly 48 includes a backing plate sandwiched between the die shoe 2 and a punch plate or holder 70. Similarly, the die assembly 50 includes a lower backing plate 72 sandwiched between the lower die shoe 64 and a die plate or holder 74.

Conventional apparatus is provided for feeding the blank 30 along the feed path 52 in predetermined increments and in timed relation to movement of the tooling 46 between the closed position illustrated in FIG. 4 and the open position illustrated in FIG. 5. Moreover, if necessary, straightening rolls of conventional configuration may be used to straighten the blank 30 prior to its entry into the feed path 52.

Upstream of the shearing station 58, the feed path 52 is defined within a slot or channel 76 in the die plate 74, and below a die cover plate 78 held in assembled relation by bolts 66. The terms upstream and downstream as used herein refer to the direction of movement of the blank 30 and/or fastener strip 32 along the feed path 52 through the tooling 46. The channel 76 is provided with a configuration corresponding to that of the blank 30, and the die cover plate 78 cooperates with the walls of the channel 76 to hold the blank straight as operations are performed at the piercing, coining and shearing stations 54, 56 and 58.

The first operation performed on the blank 30 as it travels along the feed path 52 is that of punching holes in the body portion 34 at regularly spaced intervals. Associated with the piercing station 54 are a piercing punch 80 held in an opening 82 in the punch plate 70 by a bolt 84. A cooperating piercing die insert 86 is supported in aligned relationship by the die plate 74. The punch 80 is supported in its movement by a piercing punch guide 88 mounted in the die cover plate 78. As the tooling 46 moves to its closed or shut position, the piercing punch 80 forms a hole 90, and the slug leaves the tooling through a clearance hole 92 extending through the piercing die insert 86, the backing plate 72 and the lower die shoe 64.

When the blank 30 travels from the piercing station 54 to the coining station 56, the hole 90 is coined by a coining punch 94 held in an opening 96 in the punch plate 70 by a bolt 98. The opposite side of the blank 30 is backed up by a coining die insert 100 held by the die plate 74.

Preferably the piercing and coining stations are separated by a number of steps of feed movement, or in other words by a distance at least equal to the length of a plurality of prospective nut bodies. A similar spacing is preferably provided between the coining station 56 and the shearing station 58. In this way, deformation or offset of the strip incident to the piercing and coining operations is prevented from disturbing the accurate positioning of the strip at the work stations.

In accordance with important features of the invention, the operations performed at the shearing station 58 serve to provide a fastener strip wherein interconnections and flexibility are achieved without the necessity for punching or removing scrap from the blank 30. Moreover, this is accomplished without the necessity for completely separating the blank 30 into loose parts and for thereafter reattaching the loose parts into a strip. In addition, precise spacing between fasteners of the strip is assured.

More specifically, and in accordance with the invention, two different shearing operations are performed on the blank 30 at the shearing station 58. One of these operations is a transverse shearing operation carried out by a shearing punch 102 and a cooperating shearing die insert 104. The punch 102 in the illustrated arrangement is adjacent the downstream end of the punch plate 70 and is attached to the upper backing plate 68 and upper die shoe by a bolt 106. The shearing die insert 104 is captured in a slot 108 (FIG. 12) at the downstream end of the die plate 74 and is attached to the lower backing plate 72 and lower die shoe 64 by a bolt 110.

The transverse shearing operation is best illustrated in FIGS. 4, 5, 7 and 8. In the open position of the tooling 46, the blank 30 in which have been formed coined holes 90 is advanced beyond the downstream edge of the shearing die insert 104 and beneath the shearing punch 102. Between the aligned transverse working corners of the punch 102 and die 104 there is defined a transverse shear plane extending across the body portion 34 of the blank 30. This plane is selected to lie substantially equidistant between an adjacent pair of coined holes 90.

As the tooling 46 moves from the open position of FIG. 5 to the closed position of FIG. 4, the body portion 34 of the blank 30 is sheared across the shear plane. As a result, there is separated from the end of the blank 30 a nut body 112 within which there is centrally located a transversely extending hole 90.

In accordance with an important aspect of the present invention, the transverse shearing is restricted so that the lateral flanges 40 are not fractured, but rather remain continuous. One feature of the method leading to this result involves limiting the closing or shutting movement of the shearing punch 102 relative to the shearing die insert 104. In order completely to shear the body portion 34 of the blank 30, it is not necessary for the punch 102 to travel through the full transverse dimension of the blank 30. Rather, full shearing can be accomplished if the punch moves only through a distance less then one-half of the blank transverse dimension. In the preferred arrangement, the punch displaces the sheared nut body 112 through a distance equal to or greater than about 25% of the blank thickness, about 30% presently being preferred.

In accordance with an important feature of the invention, a second shearing operation is also performed on the blank 30. In combination with limiting the shearing movement of punch 102 relative to die 104, this second shearing operation also prevents fracturing of the flanges 40. Moreover, the second shearing operation results in a spaced apart relationship between adjacent nut bodies 112 of the completed strip 32.

The second shearing operation in accordance with the invention involves longitudinally shearing the laterally projecting flanges 40 to provide severed, longitudinally extending flange segments 40A. The severed flange portions 40A are integral at each end with and are dispersed between unsevered flange portions 40B which remain integral with opposed sides of the nut bodies 112.

In the arrangement of FIGS. 4–12, the flange severing operation is carried out by a pair of fixed shearing tool inserts 114 received within the slot 108 and flanking the shearing die insert 104. The inserts 114 include sloped or curved shearing surfaces 116 adjacent to and extending upstream from the transverse shear plane defined between the punch 102 and die insert 104. Consequently, the surfaces 116 define a pair of longitudinal shear planes, one located at each lateral flange 40. The transverse shear plane extends between these lateral shear planes.

As the tooling 46 moves to the closed position and as a nut body 112 is transversely sheared from the blank 30, the descending nut body causes the flanges 40 to shearingly engage the stationary shearing surfaces 116 on the inserts 114. As a result, the segments or portions 40A are formed.

As the severed segments 40A are created through the longitudinal shearing operation, the material of the flanges 40 is stretched or elongated. Because this elongation can be distributed over the length of the severed portions 40A, the flanges 40 are not fractured. In this way, the flanges 40 are permitted to remain continuous in the fastener strip 32.

During the shearing operation, there may be some tendency for the sheared nut body 112 or for the blank 30 to tilt or rock about the transverse shear plane. For this reason, there is provided a step surface 118 opposite the bottom face of the shearing punch 102. As the punch 102 closes, the bottom of the nut body 112 engages the surface 118 and is accurately positioned with its longitudinal axis parallel to that of the blank 30.

Following the shearing operation, the series of sheared nut bodies 112 assumes a staircase configuration (FIGS. 4 and 5) extending along the feed path 52 from the shearing station 58 to the straightening station 60. The strip 32 is straightened by the interaction of a straightening punch 120 held against the upper backing plate 68 and upper die shoe 62 by bolts 122 and a straightening die 124 held against the lower backing plate 72 and lower die shoe 64 by bolts 126. In the region of the straightening station 60, the feed path 52 is defined by a channel 128 in the straightening die 124, and by a guide bar 130 at the downstream exit end of the tooling 46. The channel 128 is provided with a configuration complementary to that of the nut bodies 112, and clearance notches 132 and 134 are provided respectively in the straightening punch 120 and straightening die 124 to accept the staircase configuration of the nut bodies 112. In the illustrated arrangement, the step surface 118 is provided by a projection of the straightening die 124 which extends into the slot 108 between the inserts 114 (FIGS. 11 and 12).

When the blank 30 has been advanced to the position illustrated in FIG. 5 in the open position of the tooling 46, the nut body 112 forming the lowermost step of the staircase configuration lies between the straightening punch 120 and the straightening die 124. As the tooling is moved to the closed condition of FIG. 4, this nut body 112 is brought into alignment with the fastener strip 32. This straightening operation is illustrated in FIG. 10 where it can be seen that the severed flange segments 40A are captured between cooperating flange flattening surfaces 136 and 138 respectively of the straightening punch 120 and the straightening die 124. In this manner, the continuous flanges 40 are returned to their initial straight line configuration. This operation also serves to bring the nut bodies 112 into precise alignment. It may be desirable, as in the indicated arrangement, to provide the straightening punch and die 120 and 124 with sufficient length so that severed flange portions 40A are engaged a number of times before exiting from the straightening stations 60. It also may be desirable to directly engage the nut bodies 112 themselves between the straightening punch 120 and die 124 in order to assure their precise orientation.

In accordance with an important feature of the present invention, in the finished fastener strip 32 a predetermined and accurate spacing exists between adjacent nut bodies 112. This results from the stretching or elongation of the severed flange portions 40A during the longitudinal shearing operation. Because the segments 40A are elongated, when the flanges 40 are returned to their straight condition at the straightening station 60, a desirable spacing is created between adjacent nut bodies. This permits the finished fastener strip 32 to be coiled for shipping and handling in a convenient package. Moreover, the spacing between adjacent nut bodies provides for a desirable feeding tolerance when individual nut bodies 112 are severed from the strip in a pierce nut applying operation.

After the strip 32 exits from the tooling 46, it may travel through suitable additional apparatus for providing female threads within the holes 90 if desired, for coiling the strip 32, and for cutting the strip into desired lengths.

Referring now once again to FIGS. 1 and 2, there is illustrated the fastener strip 32 provided in accordance with the present invention. The strip includes a plurality of similar nut bodies 112. The bodies are aligned with one another and are similarly oriented in end-to-end relationship. There is provided between each adjacent pairs of nut bodies a space 140.

Laterally flanking the nut bodies 112 of the strip 32 are a pair of continuous projecting flanges 40. Each flange includes a number of longitudinally extending severed segments 40A alternating with unsevered segments 40B. Each severed segment 40A is integral at both of its ends with the adjacent unsevered segments 40B. Moreover, each of the nut bodies 112 is associated with an unsevered or integral flange segment 40B of each of the flanges 40. In this way, the flanges 40 with the alternating severed and unsevered segments 40A and 40B serve to maintain the nut bodies 112 in the strip 32.

Since each of the severed flange portions 40A has been stretched or elongated, these segments 40A have a smaller cross-sectional area than do the unsevered flange portions 40B. The severed flange segments 40A are longer than the distance or space 140 between adjacent nut bodies. Furthermore, the severed flange portions 40A are shorter than the length of the nut bodies 112.

Alternative embodiments of the fastener strip and strip forming method of the present invention are illustrated respectively in FIGS. 13-16, FIGS. 17-19, and FIGS. 20-23. In many respects, the structures shown in these figures are similar to that described above and illustrated in FIGS. 1-12. Consequently, similar reference numerals are used for elements similar to those described above, and the following descriptions are limited to portions of the structure which are not similar.

Referring first to FIGS. 13-16, in FIG. 13 there is illustrated a blank 150 which is formed into a fastener strip 152 in accordance with the method of the present invention. The blank may be identical to the blank 30 described above, with the exception that the flanges 40 project laterally from the upper region of the body portion 34 rather than the lower region.

In forming the fastener strip 152, the various operations carried out upon the blank 150 are similar to those described above, with the exception of the operations carried out at a shearing station 154 illustrated in FIGS. 14-16. In addition to the shearing punch 102 and the shearing die insert 104, the shearing station 154 is provided with a pair of shearing inserts 156 for longitudinally shearing the flanges 40. The inserts are movable rather than stationary, and may be integral with or attached to the shearing punch 102, as by fasteners 158. In order to reinforce the shearing inserts 156, the shearing punch 102 may be provided with a step-like extension 160.

Associated with the shearing die insert 104 are a pair of longitudinal shearing dies 162 aligned with shearing surfaces 164 on the shearing inserts 156. The shearing surfaces 164 are located adjacent to the transverse shear plane defines between the transverse shearing punch 102 and die 104. Longitudinal shear planes are defined extending in the upstream direction from the transverse shear plane.

When the shearing punch 102 moves toward its closed position relative to the shearing die insert 104, the shearing surfaces 164 sever portions 40A of the flanges 40 and move them downwardly against the shearing dies 162. In this manner, the severed segments 40A are defined and, during the shearing operation, the severed segments 40A are stretched or elongated.

Additional alternative embodiments of the fastener strip and method of the present invention are illustrated in FIGS. 17-19. In this arrangement, the method is carried out on the blank 30, and the method differs from those described above in that there are provided two separate shearing stations and the transverse and longitudinal shearing operations are not carried out simultaneously.

More specifically, with reference to FIG. 18, it can be seen that there are provided a pair of spaced apart longitudinal shearing punches 170 each cooperating with a longitudinal shearing die 172, the punches and dies 170 and 172 being aligned with the flanges 40. The punch 170 and die 172 define a longitudinal shearing station 174 which is spaced upstream from the shearing station 58 including the transverse shearing punch 102 and cooperating die 104. The punches 170 may be mounted upon extension of the shearing punch 102, or otherwise mounted upon the punch assembly 48.

When the strip 30 is advanced into the longitudinal shearing station 174 and the tooling moved to the closed position, the punches 170 move down, flanking the sides of the body portion 34 of the blank. When the lowermost shearing surfaces 176 of the punches 170 engage the flanges 40, they shear segments of the flanges 40 to provide severed flange segments 40A. At this point, the severed segments 40A are integral with unsevered segments 40B which are themselves integral with the body portion 34 of the blank 30. As the blank 30 is advanced along the feed path 52, the transverse shearing operation as described is carried out in the region of the severed segments 40A.

Still further embodiments of the fastener strip and strip forming method of the present invention are illustrated in FIGS. 20-23. In FIG. 20 there is illustrated a blank 180 formed into a fastener strip 182 by the method of the present invention. The blank 180 includes a pair of continuous flanges 40 and a body portion 34. The blank 180 is to be formed into a strip of standard pierce nuts, and the body portion includes a pilot portion 184 from the top corners of which the flanges 40 directly extend.

When a standard pierce nut is mounted in a panel, flanges at the top edges thereof engage the panel surface. Consequently, in carrying out the method of the present invention on the blank 180, it is desirable not to longitudinally shear the flanges 40 immediately adjacent the pilot portion 184. Therefore, the longitudinal shear planes are defined laterally outwardly of the side walls of the pilot portion 184 to the end that undisturbed flange regions extend throughout the full length of each nut body 112.

Referring now to FIGS. 21-23, there is illustrated a shearing station 186 associated with the tooling for forming the fastener strip 182. The shearing station includes a shearing punch 188 and a cooperating shearing die assembly 190. The punch 188 and die assembly 190 include transverse shearing structure similar to that described above in connection with FIGS. 4-13. However, in the arrangement of FIGS. 21-23, the shearing punch 188 has a lateral width such that it overlies a portion of the flanges 40. Consequently, these portions remain integral with the sheared nut bodies 112 throughout the length of each nut body.

Cooperating with the shearing punch 188 are a pair of longitudinal shearing die portions 192 of the die assembly 190. As can best be seen in FIGS. 22, these die portions 192 underlie the outermost edges of the flanges 140, and include longitudinally extending shearing surfaces 194 for severing portions 40A of the flange. Consequently, in this arrangement, the longitudinal shear planes are defined at the clearance between the sides of the shearing punch 188 and the die portions 192.

When the severed nut bodies 112 reach the straightening station 60, the severed flange segments 40A are returned to their initial flat configuration and are again coplanar with the unsevered flange segments 40B as well as with those innermost parts of the flanges 40 which have not been deformed in the shearing operation.

Having reference now to FIGS. 24-27 there is illustrated tooling generally designated as 200 for forming the fastener strip 32 from the blank 30 in accordance with a method which is an alternative embodiment of the present invention. Several components of the tooling 200 are similar to components of the tooling 46 described above in conjunction with FIGS. 1-12, and these components are provided with the same reference numerals and are not again described in detail. Moreover, the tooling 200 may include a piercing station 54 and a coining station 56 not illustrated in FIGS. 24-27.

In the method performed by the tooling 200, the nut body 112 sheared from the end of the blank 30 is supported during the shearing operation in order to prevent any tendency of the nut body 112 to tilt or pivot out of alignment with the blank 30. In accordance with this feature of the invention, the separation of the nut body 112 from the blank 30 is reliably controlled so that the transverse shear plane is precisely oriented substantially perpendicular to the longitudinal axis of the blank. Consequently, each pilot portion 42 of the nut bodies 112 of the finished strip 32 is reliably rectangular in shape.

In general, the tooling 200 includes a shearing station generally designated as 202 and a straightening station generally designated as 204. The shearing station 202 includes shearing punch 102 cooperating with a shearing die insert 206 to perform the transverse shearing operation and sever a nut body 112 from the blank 30. Shearing punch 102 also cooperates with the shearing tool inserts 114 (FIG. 25) to perform the longitudinal shearing operation and form the severed flange segments 40A. In the arrangement of FIGS. 24-27 the shearing die insert is held to the die plate 74 by a fastener 208, and the inserts 114 may also be attached by suitable fasteners (not shown) if desired.

During the shearing operation, the tooling moves from the open position of FIG. 27 to the closed position of FIG. 24. In most respects the transverse and longitudinal shearing operations are performed in the manner discussed above in reference to FIGS. 1-2.

In accordance with a feature of the invention, the severed nut body 112 is fully supported during the shearing operation by a pressure pad assembly generally designated as 210. The assembly 210 includes a pressure member 212 which continuously engages the blank 30 and then the severed nut body 112 in opposition to the shearing punch 102 throughout the shearing operation. As a result, the severed nut body is maintained parallel with the blank 30 and strip 32, and the transverse shear plane is positively oriented.

More specifically, the assembly 210 includes the pressure element 212 which replaces the portion 104 of the straightening die 124 of the tooling 46 described above. The element 212 is captured for transverse sliding movement with the slot 108 between the shearing die insert 206 and a straightening die 213. The upper surface 214 of element 212 (FIG. 25) is shaped to engage and support the severed nut 112 during the severing operation. A number of springs 216 located in openings in a spring retaining plate 220 are held in compression between a lower pressure plate 222 (FIG. 24) associated with the lower die shoe and an upper spring pad 224 located below the lower backing plate 72. The upper spring pad bears against the pressure member 212 continuously to bias its upper surface 214 toward the blank 30 or severed nut 112.

Upward movement of the pressure member 212 is limited by engagement of an enlarged lower head portion 226 against the shearing die insert 206 and straightening die 213 (FIGS. 26 and 27). The head 226 is accommodated within an opening 228 in the lower backing plate 72. In the open position of the tooling 200, the top surface 214 of pressure member 212 is aligned with the upper surface of the shearing die insert 206, and the blank 30 and strip 32 can be advanced from the position of FIG. 26 to the position of FIG. 27 in preparation for the next shearing operation.

Springs 216 are selected to apply a firm holding force to the blank 30 and severed nut 112 during the shearing operation as the tooling moves from the position of FIG. 27 to the closed position of FIG. 24. This force is such as to deform the severed flange segments 40A as the tooling returns from the closed position of FIG. 24 to the open position of FIG. 26. Consequently, the upward movement of the pressure element 212 returns the severed nut 112 to a position aligned with the blank 30, and the staircase arrangement of severed nut bodies experienced with the tooling described above is not present.

Although the severed nut body 112 is in line with the blank 30 when the tooling 200 is open, the severed flange segments 40A are not necessarily straightened by upward movement of the pressure member 212. Thus the flanges 40 may assume a rippled or wavey configuration as seen in FIGS. 24, 26 and 27. Depending upon the shape assumed by the severed flange segments 40A, the sheared ends of adjacent nut body portions 112 may substantially abut (as shown in the drawings) or may be somewhat spaced apart.

In either case, the straightening station serves to assure that the flanges 40 are returned to a straight line configuration with the desired spacing between individual nut bodies of the strip 32. Located at the straightening station is a straightening punch 230 cooperating with the straightening die 213. As the tooling 200 moves to the closed position and a nut body 112 is severed from blank 30 at the shearing station 202, the strip 32 moves downwardly as a unit through the limited distance effective to produce shearing.

In the closed position of the tooling 200, the upper surfaces of the flanges 40 are engaged by upper surfaces 232 formed on projections 234 of the straightening punch 230. The opposite surfaces of flanges 40 are engaged by lower surfaces 236 on the straightening die 213. As a result, and as can be seen in FIG. 24, the flanges 40 are straightened into a line.

While the present invention has been described with reference to details of the illustrated embodiments, such details are not intended to limit the scope of the invention as defined in the appended claims.

What is claimed and desired to be secured by Letters Patent of the United States is:

1. A method of forming a strip of interconnected nut bodies from an elongated blank having a body portion and a pair of opposed flanges thinner than the body portion, said method comprising:
   longitudinally severing the blank at regular intervals to separate spaced segments of the flanges from the body portion, with the severed segments being integral at both ends with unsevered flange portions; and
   transversely severing the main body portion of the blank at regular intervals to form discrete nut bodies interconnected with adjacent nut bodies by the severed flange segments.

2. The method of claim 1, said transversely severing step comprising shearing said body portion.

3. The method of claim 2, said longitudinally severing step comprising shearing said flanges.

4. The method of claim 1, further comprising elongating the severed flange segments to produce a spacing between adjacent nut bodies.

5. The method of claim 1 wherein said longitudinally and transversely severing steps are performed simultaneously.

6. The method of claim 1 wherein said longitudinally severing step is performed prior to said transverse severing step.

7. The method of claim 3 wherein said longitudinal and transverse shearing steps are performed simultaneously.

8. The method of claim 4 wherein said longitudinal and transverse shearing steps and said elongating step are performed simultaneously.

9. The method of claim 4 further comprising straightening the strip of interconnected nut bodies following said shearing and elongating steps.

10. The method of claim 9 wherein said straightening step comprises flattening the severed and unsevered flange portions.

11. The method of claim 1, said nut bodies comprising pierce nuts.

12. A method of manufacturing a coilable fastener strip having numerous aligned and spaced apart fastener bodies interconnected by flexible metallic portions, the method being performed upon an elongated blank having a profile corresponding to the profile of the fastener bodies, the blank having a body portion and having a pair of laterally extending continuous flanges with a transverse thickness substantially less than the transverse thickness of the body; said method comprising multiple repetitions of the steps of:
   shearing the body portion of the blank to separate individual fastener bodies from the blank;
   restricting the lateral extent of said shearing so that said flanges remain continuous; and
   stretching said flanges to establish a spacing between adjacent fastener bodies.

13. The method of claim 12, said body portion shearing step comprising shearing the body in the transverse direction.

14. The method of claim 13, further comprising the step of shearing said flanges in the longitudinal direction for a limited distance less than the length of a fastener body.

15. The method of claim 14, said flange shearing step and said stretching step being performed simultaneously.

16. The method of claim 15, said flange shearing and stretching steps being performed simultaneously with said body portion shearing step.

17. The method of claim 15, said flange shearing and stretching steps being performed prior to said body portion shearing step.

18. The method of claim 14, further comprising flattening said continuous flanges after said flange shearing and stretching steps.

19. A method of forming a nut strip of the type including numerous similarly oriented nut bodies each having a given length, lateral width and transverse height, the nut bodies being spaced longitudinally apart from one another and being flexibly interconnected by a pair of metallic connecting elements continuous throughout the length of the nut strip;

said method being performed on a workpiece in the form of an elongated blank of uniform cross-sectiion similar to that of the nut bodies, the blank including a body portion and further including a pair of continuous flanges projecting from the body portion and having a cross-sectional area small in relation to the cross-sectional area of the body portion;

said method comprising:

shearing and elongating spaced segments of each flange while leaving the flange continuous and leaving unsevered flange elements connected to the body portion;

said flange shearing and elongating step being carried out at longitudinal shear planes parallel with the longitudinal axis of the blank;

shearing said body portion in the transverse direction to separate individual nut bodies from the blank;

said body portion shearing step being performed at a transverse shear plane extending between said longitudinal shear planes;

limiting the transverse movement of said separated nut during said body portion shearing step in order to avoid severing of said flanges; and flattening said flanges to align said nut bodies with unsevered flange segments connected to each nut body interconnected by severed flange segments extending between adjacent nut bodies.

20. A method of forming a nut strip in a stamping press from an elongated blank having a body portion and laterally extending flanges, said method comprising:

advancing the blank along a feed path through the stamping press;

shearing the body portion of the blank in a transverse direction with a transverse shearing punch cooperating with a transverse shearing die in order partially to shear the blank and shear a nut body from the body portion of the blank;

limiting the shearing movement of the transverse shearing punch and die so that the sheared nut body is displaced from the strip a distance less than one-half of the transverse dimension of the blank body portion in order to avoid fracturing said flanges;

shearing parts of said flanges in the longitudinal direction with a pair of spaced apart longitudinal shearing tools disposed in alignment with the laterally extending flanges to form severed flange segments having a length less than the length of a sheared nut body, the severed flange segments being integral at both ends with unsevered flange segments;

stretching said severed flange segments; and straightening said severed and unsevered flange segments with a straightening punch and die in order to align sequential severed nut bodies.

21. The method of claim 20 further comprising punching holes in said blank body portion with a piercing punch located upstream from the transverse shearing punch a distance at least equal to the length of a plurality of nut bodies.

22. The method of claim 21, further comprising coining the punched holes with a coining punch disposed between the piercing punch and transverse shearing punch and spaced from each by a distance at least equal to the length of a plurality of nut bodies.

23. The method of claim 20 wherein said flange shearing step is performed by positioning the longitudinal shearing tools in a fixed position adjacent and extending downstream from the transverse shearing punch and die.

24. The method of claim 20 wherein said flange shearing step is performed with movable longitudinal shearing tools.

25. The method of claim 24 wherein the movable longitudinal shearing tools are positioned adjacent and extending upstream from the transverse shearing punch and die.

26. The method of claim 24 wherein the movable longitudinal shearing tools are positioned upstream from the transverse shearing punch and die a distance at least equal to the length of one nut body.

27. The method of claim 20 wherein said flange shearing step comprises shearing said flanges along planes substantially coinciding with the sides of the blank body portion.

28. The method of claim 20 wherein said flange shearing step comprises shearing said flanges along planes laterally spaced outward from the sides of the blank body portion.

29. The method of claim 20, further comprising supporting the severed nut body in the region opposed to the transverse shearing punch.

30. The method of claim 29, said supporting step being performed by a fixed step surface against which the severed nut body is moved by the transverse shearing punch at the end of said shearing movement.

31. The method of claim 29, said supporting step comprising biasing a movable support member against the severed nut body in opposition to the transverse shearing punch during said transverse shearing step.

* * * * *